(12) United States Patent
Van Den Berg et al.

(10) Patent No.: US 7,987,815 B2
(45) Date of Patent: Aug. 2, 2011

(54) METHOD OF AND AN INSTALLATION FOR FEEDING AN ANIMAL IN A FEEDING BOX

(75) Inventors: Karel Van Den Berg, Bleskensgraaf (NL); Howard Sie, Rotterdam (NL); Lucien Eliza Niels Voogd, Leerdam (NL)

(73) Assignee: Maasland N.V., Maassluis (NL)

( * ) Notice: Subject to any disclaimer, the term of this patent is extended or adjusted under 35 U.S.C. 154(b) by 221 days.

(21) Appl. No.: 12/296,940

(22) PCT Filed: Mar. 23, 2007

(86) PCT No.: PCT/NL2007/000082
§ 371 (c)(1),
(2), (4) Date: Oct. 13, 2008

(87) PCT Pub. No.: WO2007/117134
PCT Pub. Date: Oct. 18, 2007

(65) Prior Publication Data
US 2009/0133635 A1    May 28, 2009

(30) Foreign Application Priority Data

Apr. 12, 2006 (NL) ..................................... 1031575

(51) Int. Cl.
*A01K 5/00* (2006.01)
(52) U.S. Cl. ..................................... 119/51.02; 119/521
(58) Field of Classification Search ............... 119/14.02, 119/51.02, 52.1, 53, 53.5, 521
See application file for complete search history.

(56) References Cited

U.S. PATENT DOCUMENTS

| | | | | |
|---|---|---|---|---|
| 3,157,157 A * | 11/1964 | Clay et al. | .................. | 119/51.11 |
| 3,557,758 A * | 1/1971 | Lack | .......................... | 119/51.02 |
| 3,699,922 A * | 10/1972 | Holm | ........................ | 119/14.03 |
| 3,714,736 A | 2/1973 | Weaver | | |
| 3,750,626 A * | 8/1973 | Smith | ........................ | 119/51.02 |
| 4,049,950 A * | 9/1977 | Byrne et al. | .................. | 235/376 |
| 4,508,058 A * | 4/1985 | Jakobson et al. | .......... | 119/14.02 |
| 4,513,687 A * | 4/1985 | De Jong | ........................ | 119/521 |
| 4,753,194 A * | 6/1988 | Kuip | .............................. | 119/521 |
| 5,309,864 A * | 5/1994 | Harmsen et al. | ........... | 119/51.02 |
| 5,653,192 A * | 8/1997 | Sheen et al. | ............... | 119/51.02 |

(Continued)

FOREIGN PATENT DOCUMENTS

DE    3623816 C2    1/1987

(Continued)

*Primary Examiner* — Rob Swiatek
*Assistant Examiner* — Ebony Evans
(74) *Attorney, Agent, or Firm* — Coraline J. Haitjema; David Owen; Hoyng Monegier LLP

(57) ABSTRACT

A method of feeding an animal in a feeding box including in no particular order, at least the actions of: a) registering the presence of the animal in the feeding box, b) closing the feeding box and locking the feeding box in such a way that access to the feeding box is impeded for an animal outside the feeding box, c) supplying feed to the animal in the feeding box in a chosen eating period of time. For an animal that does not leave the feeding box after an initially chosen eating period of time has elapsed, the initially chosen eating period of time beginning immediately after the performance of step b), within a first waiting time span chosen contiguously to said period of time, in which the animal is given the possibility of leaving the feeding box, step c) is repeated at least once.

16 Claims, 3 Drawing Sheets

U.S. PATENT DOCUMENTS

| | | | |
|---|---|---|---|
| 5,950,562 A * | 9/1999 | Schulte et al. | 119/51.02 |
| 6,899,044 B2 * | 5/2005 | Thibault et al. | 119/51.02 |
| 7,484,474 B2 * | 2/2009 | Van Den Berg et al. | 119/14.02 |
| 2005/0217592 A1 * | 10/2005 | Larsen | 119/51.02 |
| 2008/0017119 A1 * | 1/2008 | Van Den Berg et al. | 119/14.04 |
| 2008/0236500 A1 * | 10/2008 | Hodges et al. | 119/14.02 |

FOREIGN PATENT DOCUMENTS

| | | |
|---|---|---|
| EP | 0205219 A1 | 12/1986 |
| EP | 0610171 A2 | 8/1994 |
| NL | 7900426 A | 7/1980 |
| NL | 1007632 C | 8/1999 |

* cited by examiner

METHOD OF AND AN INSTALLATION FOR FEEDING AN ANIMAL IN A FEEDING BOX

CROSS REFERENCE TO RELATED APPLICATIONS

This application is a 35 USC 371 application of International Application No. PCT/NL2007/000082 which was published under PCT Article 21(2) in English, the contents of which are hereby incorporated by reference in their entirety.

BACKGROUND OF THE INVENTION

1. Field of the Invention

The invention relates to methods of feeding an animal in a feeding box and also to installations for feeding an animal.

2. Description of the Related Art

Methods of feeding an animal in a feeding box are generally known which comprise a) identifying the animal in the feeding box, b) closing the feeding box, in such a way that access to the feeding box is impeded for an animal outside the feeding box, and c) supplying feed to the animal in the feeding box in a chosen eating period of time. One such method of feeding is known from DE3623816 wherein, in the case of a chosen eating period of time, the eating time of the animal corresponds thereto to a large extent. There is a possibility that, in this manner, the animal's needs are unsatisfactorily met.

BRIEF SUMMARY OF THE INVENTION

The invention aims at providing a method in which the animal's needs are satisfied in combination with a chosen eating period of time.

For this purpose, the method according to the invention provides that for an animal that does not leave the feeding box after an initially chosen eating period of time has elapsed, the initially chosen eating period of time beginning immediately after closing of the box, within a first waiting time span chosen contiguously to said period of time, in which the animal is given the possibility of leaving the feeding box, the step of supplying feed to the animal in the feeding box in a chosen eating period of time is repeated at least once. The invention is based on the insight that an animal is able partially to determine its own eating period of time, the eating period of time comprising an imposed chosen eating period of time and an eating period of time to be freely determined by the animal, thus teaching the animal, on the one hand, a conscious eating behaviour and, stimulating, on the other hand, a feed consumption without stress, respectively.

According to a further aspect of the invention, feed is supplied after identification of the animal.

In a preferred embodiment according to the invention, feed is only supplied to an animal that is eligible to eat.

In an embodiment of a method according to the invention, for an animal that, after the chosen eating period(s) of time following the initially chosen eating period of time has/have elapsed, does not leave the feeding box within the chosen waiting time span(s) chosen contiguously to said following chosen eating period(s) of time, in which the animal is given the possibility of leaving the feeding box, step c) is repeated in the chosen waiting time span(s). Owing to the fact that the animal is able to determine its own eating time, the needs of the animal itself are met. The animal is offered an unlimited amount of feed in the feeding box, so that the animal will associate the feeding box with a positive experience. This will positively influence the feed consumption.

In an embodiment of a method according to the invention, during the initially chosen eating period of time, an animal in the feeding box has no possibility of leaving the feeding box. In this method, the method softly counteracts the formation of remaining feed in a feeding box. An animal that decides to enter the feeding box will get accustomed to the fact that this results in not being able to leave the feeding box during the initially chosen eating period of time. The undesirable behaviour of certain animals in a herd quickly to consume tasty remaining feed from different feeding boxes is now discouraged. The animal in the feeding box is given ample opportunity to consume the supplied feed completely during the initially chosen eating period of time. The animal being confined with the feed during the chosen eating period of time will contribute to a strong reduction of the risk of remaining feed being left in the feeding box upon departure of the animal.

In an embodiment of a method according to the invention, after the initially chosen eating period of time has elapsed, the animal in the feeding box is given the possibility of leaving the feeding box and access to the feeding box remains impeded for an animal outside the feeding box. The animal is safeguarded against stress-increasing influences by other (more dominant) animals throughout its eating time. In this manner, eating animals will no longer be jostled, which prevents stress, and possibly bad feed consumption and the like as a result thereof.

In an embodiment of a method according to the invention, the feed consumption of the animal is observed and, when a chosen second waiting time span in which no feed consumption takes place is exceeded, an animal outside the feeding box is given access to the feeding box. By means of this feature the feeding box is prevented from being used inefficiently. An animal that does no longer demonstrate eating behaviour is apparently satisfied as regards feed consumption and needs no longer occupy, from that moment, the feeding box that should become available for other animals of the herd that do wish to consume feed.

In an embodiment of a method according to the invention, the feed consumption rate of the animal is observed and, when the feed consumption rate is below a chosen feed consumption rate threshold value, access to the feeding box becomes possible for an animal outside the feeding box. This is another possibility of preventing the feeding box from being used inefficiently. The chosen feed consumption rate threshold value is adjustable at any moment. The adjustability comprises both values to be inputted directly into a control unit of the installation and pre-programmed values in the control unit.

In an embodiment of a method according to the invention, after the initially chosen eating period of time has elapsed, the animal in the feeding box is given the possibility of leaving the feeding box and an animal outside the feeding box is given access to the feeding box. In the feeding box there may be provided means with the aid of which the (intelligent) animal is able to observe the elapsed eating time and the still remaining eating time of an eating period of time. At the end of an eating period of time the animal thus knows that the moment to decide has come. Said means may be designed in various ways, and may be optical, acoustic and the like. It is essential that the means do not compel the animal directly in a physical or other way to leave the feeding box, because it is up to the animal itself to decide. The animal is now taught to make an even more conscious choice between staying in the feeding box after the chosen eating period of time has elapsed and leaving the feeding box. If now the animal does not leave the feeding box within a chosen third waiting time span, steps b)

and c) take place. The feeding box is now again closed in such a way that the entrance is blocked for an animal outside the feeding box. Feed is supplied to the animal in the feeding box in a chosen eating period of time. Habituation to this feeding strategy will lead to a conscious eating behaviour, it being up to the (intelligent) animal to decide whether the need for an additional amount of feed at the moment to decide counterbalances the renewed isolation from the herd during an again chosen eating period of time.

In an embodiment of a method according to the invention, if, after the chosen eating period(s) of time, following the initially chosen eating period of time, with chosen waiting time span(s) in which the animal is given the possibility of leaving the feeding box has/have elapsed, the animal does not leave the feeding box, steps b) and c) take place. This embodiment of a method according to the invention makes it possible for the animal to choose during eating, at several moments to decide, between renewed isolation including additional feed and leaving the feeding box.

The invention also relates to a method of feeding an animal in a feeding box, the method comprising at least the steps of identifying the animal in the feeding box, closing the feeding box, in such a way that access to the feeding box is impeded for an animal outside the feeding box, supplying feed to the animal in the feeding box in a chosen eating period of time, in which method closing of the feeding box only takes place in case of an animal that is eligible to eat, which animal is confined in the feeding box, the possibility of leaving the feeding box is given to said animal only after an initially chosen eating period of time has elapsed and access to the feeding box remains impeded for an animal outside the feeding box. The identification of the animal is used for closing or not closing the feeding box in dependence on the identified animal. In this concept, an efficient use of time of the feeding box is essential, however, the possibility for the animal of eating undisturbed in the feeding box being maintained.

In an embodiment of a method according to the invention, for the initially chosen eating period of time, the chosen eating period of time, the following chosen eating period(s) of time, the chosen first waiting time span, the chosen second waiting time span, the chosen third waiting time span, the chosen waiting time span(s), the chosen feed consumption rate threshold value, a value is adjustable at any moment. It is possible to program these values in a control unit of an installation suitable for performing the method or to input these values directly into a control unit. This makes it possible to adapt per situation to changing animal conditions and animal related matters.

In an embodiment of a method according to the invention, the adjustable value also depends on the established identity of the animal, so that it will be possible to apply suitable feeding parameters per animal.

In an embodiment of a method according to the invention, the value also depends on historical, animal dependent data. These historical, animal dependent data comprise at least the following data: visiting behaviour of the animal to the feeding box, lactation stage of the animal, breed of the animal, (expected) milk yield, behaviour of the animal in general, health of the animal, milk quality and milk quantity (inter alia cell count of the milk and the (expected) milk yield), the (expected) feed consumption, the feed still due to the animal. Of course, these are only a few data from the collection of possible, historical, animal-dependent data.

The invention further relates to an installation for feeding an animal, which installation is provided with a frame that encloses at any rate at least partially a frame area, the frame area being suitable for receiving an animal, and with an entrance to the frame area, which entrance comprises at least one passage means that is movably connected with the frame for closing or releasing the frame area, a locking means for locking the passage means, an identification means for identifying an animal, a feeding means for supplying feed to an animal in the installation, and a control unit for controlling the locking means and the feeding means. The control unit is programmed for performing the aforementioned methods.

In an embodiment of an installation according to the invention, the locking means is controllable by the control unit for blocking the direction of movement of the at least one passage means in a direction towards the frame area and for releasing simultaneously a direction of movement of the passage means in a direction away from the frame area. Access to the feeding box is now impeded, so that an animal outside the feeding box has no access to the feeding box. An animal in the feeding box is now safeguarded against jostling behaviour of other animals.

Moreover, it is pointed out that the entrance to the feeding box may comprise several passage means.

In an embodiment of an installation according to the invention, between the at least one passage means and the frame, a neutral position means is active, which neutral position means is suitable for positioning the passage means into one particular neutral position. As soon as an animal has passed the passage means, access to the feeding box has to be impeded for other animals. The neutral position means ensures that the passage means will quickly assume a neutral position. It is also conceivable to design the neutral position means in such a way that the neutral position of the at least one passage means is achieved in an active manner.

In an embodiment of an installation according to the invention, the neutral position means comprises a moving element and a guiding element that is provided with a curve path, the curve path of the guiding element extending from the neutral position in a rising manner on both sides of the neutral position, which moving element and the curve path of the guiding element are in contact with each other, in such a way that the moving element is movable over the curve path, in such a way that the moving element is capable of assuming the neutral position under the influence of gravitational force. Upon pivoting of the passage means the moving element connected therewith moves over the curve path of the guiding element. Owing to the rising manner in which the curve path extends, the moving element connected with the passage means soon falls back to the lowest point of the curve path after an animal has passed. The moving element assumes the neutral position under the influence of gravitational force.

In an embodiment of an installation according to the invention, the guiding element provided with a curve path has a recess at the place of the neutral position. This means that a moving element, relative to the situation in which no recess is provided, engages quickly. Fluctuations around the neutral position are now counteracted. It now takes less time for the moving element to assume the neutral position.

In an embodiment of an installation according to the invention, the curve path comprises a first portion and a second portion, the lowest point of the first portion being at a lower level than the lowest point of the second portion. This is only one of the many possible embodiments of the recess in the curve path.

In an embodiment of an installation according to the invention, a neutral position means is applied. The neutral position means serves for positioning a passage means into one particular neutral position, the neutral position means comprising a moving element and a guiding element with curve path, the curve path of the guiding element extending from the neutral position in a rising manner on both sides of the neutral position. Moving element and guiding element are in contact with each other, in such a way that the moving element is movable over the curve path of the guiding element. The moving element is capable of assuming the neutral position under the influence of gravitational force. A neutral position means comprising a moving element and a guiding element that are in contact with each other in such a way that the moving element is movable relative to the curve path of the guiding element and the moving element is capable of assuming one particular neutral position under the influence of gravitational force, is, apart from being applicable in the aforementioned installation for feeding an animal, also applicable in various other installations in agriculture, for example a milking robot, a selection gate, etc. It is possible for the guiding element to have a recess at the place of the neutral position. Besides, an embodiment is conceivable in which the curve path comprises a first portion and a second portion, the lowest point of the first portion being at a lower level than the lowest point of the second portion. Also outside the field of agriculture, the described means is suitable in situations in which it is desirable for a moving passage means to assume quickly a particular position.

BRIEF DESCRIPTION OF THE DRAWINGS

The invention will now be explained in further detail with reference to the accompanying figures, in which: The invention will now be explained in further detail by way of example with reference to the accompanying figures, in which.

DESCRIPTION OF ILLUSTRATIVE EMBODIMENTS

Figure 1:
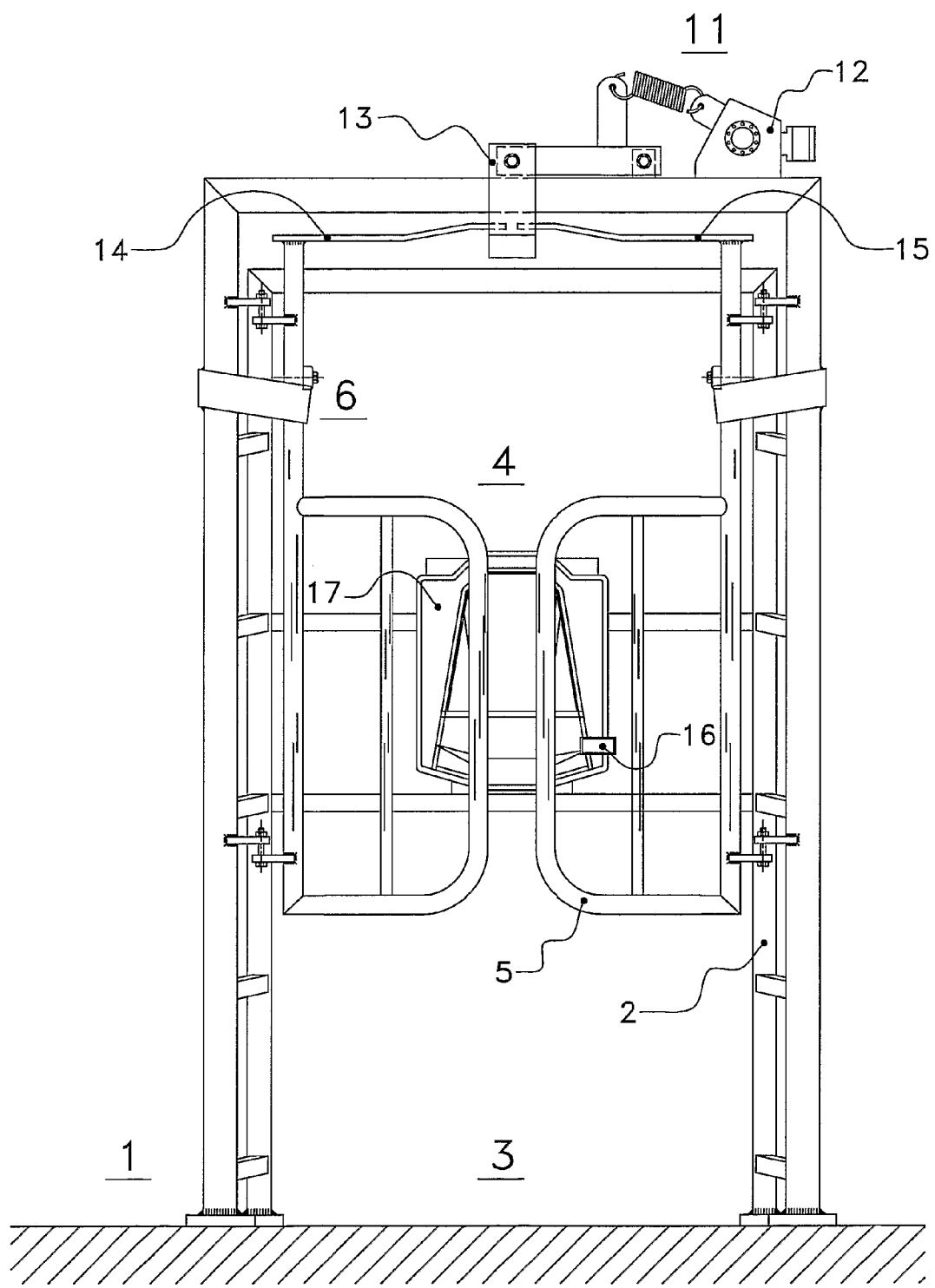
FIG. 1 is a front view of a possible installation in which a method according to the invention is applied.
Figure 3A:
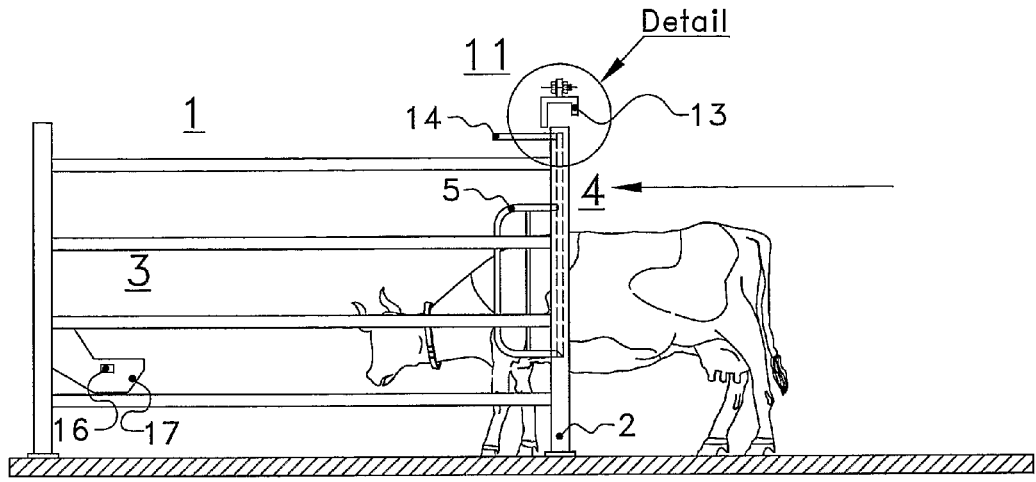
FIG. 3 shows schematically the control of the locking means of the passage means chosen as box doors.
Figure 3B:
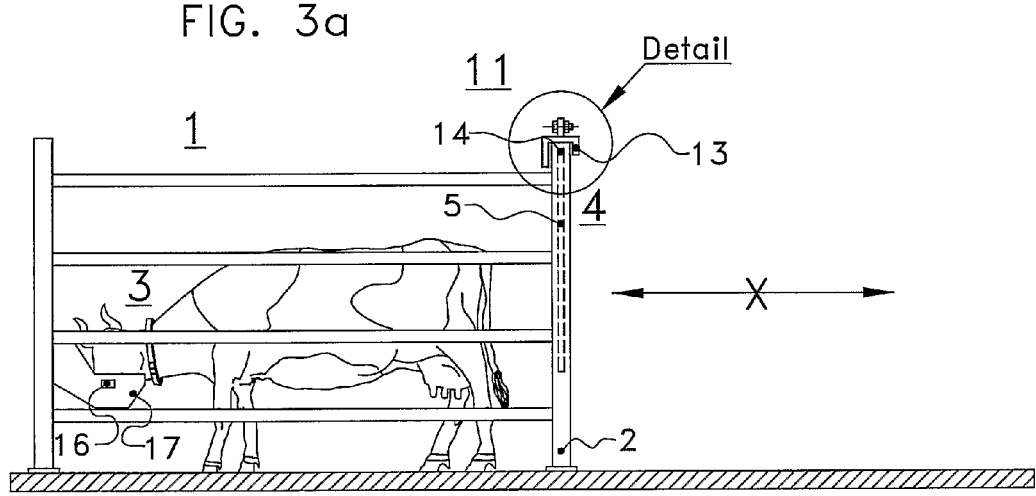

FIG. 1 shows an embodiment of an installation according to the invention. The installation consists of a frame 2 that encloses at any rate at least partially a frame area 3. The frame area 3 is suitable for receiving an animal. If no animal is present in the frame area 3 of the feeding box 1, an animal can freely enter the installation for feeding an animal (see also FIG. 3a). In this case, the animal passes the entrance 4 to the frame area 3, constituted by two box doors that are movably connected with the frame 2 as chosen passage means 5. Each box door 5 assumes one particular neutral position after the animal has passed through a neutral position means 6 that is active between a box door and the frame (FIG. 3b).

Figure 2:
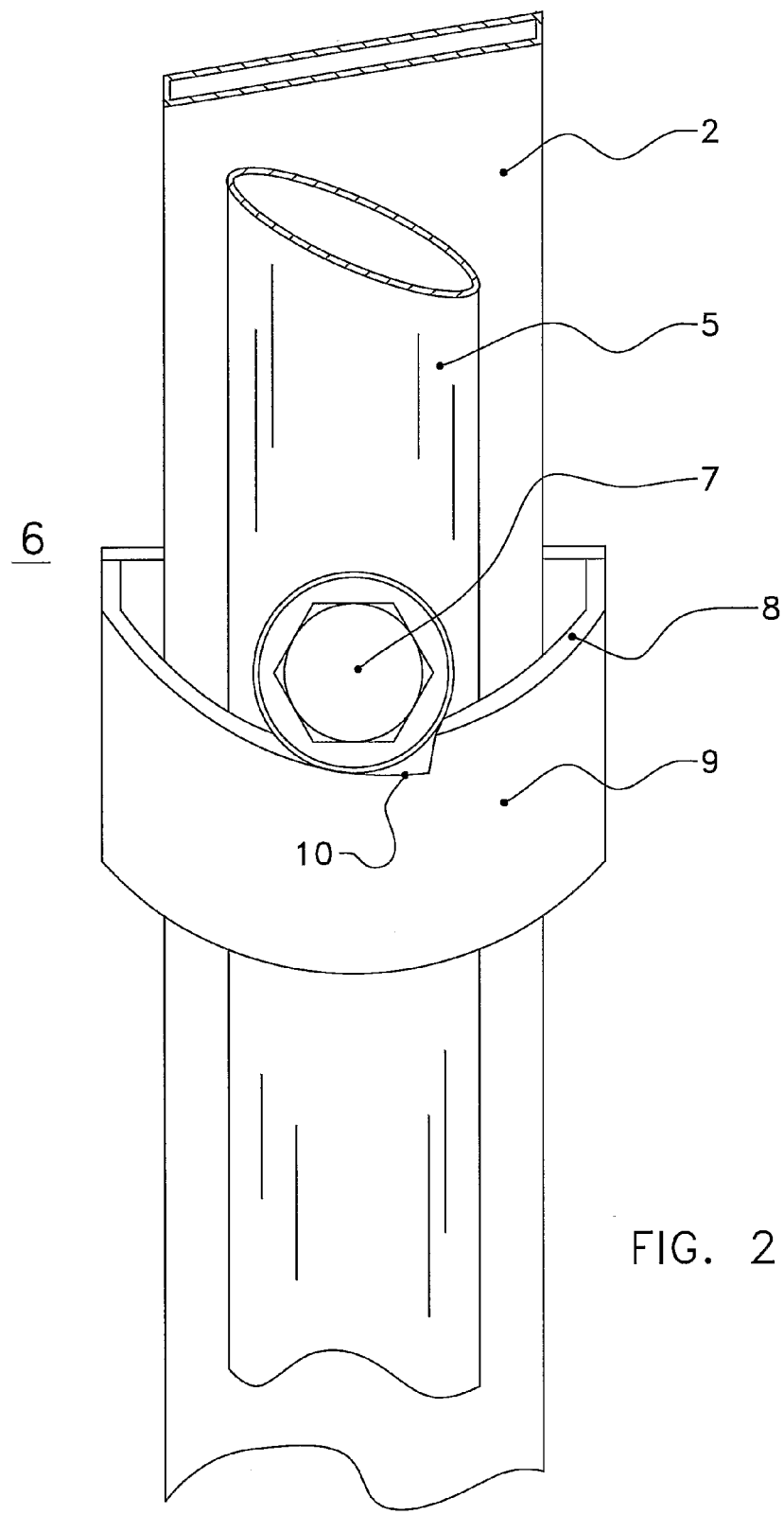
FIG. 2 is a detailed view of the neutral position means of a feeding box door as a chosen passage means.

FIG. 2 shows the neutral position means 6 in more detail. The neutral position means 6 comprises a moving element 7 chosen as a bearing and a guiding element 9 with curve path 8 which are in contact with each other, in such a way that the bearing 7 is movable over the curve path 8 of the guiding element. The curve path of the guiding element 9 extends from the neutral position (shown in FIG. 2) in a rising manner on both sides. The bearing 7 connected with a box door 5 extends in a rising manner over the curve path 8 upon pivoting of the box door. After the animal has passed, the bearing 7 connected with said box door falls back by gravitational force and eventually reaches the situation as shown in FIG. 2 is reached. In this context, the use of box doors 5 with obliquely disposed pivot points is one of the many other possibilities to achieve the same effect.

A recess 10 at the place of the neutral position of the guiding element 9 ensures that the neutral position is quickly engaged after the bearing 7 has rolled back over the curve path 8. In this position the entrance 4 to the frame area 3 is closed (not necessarily locked). The curve path 8 of the guiding element 9 chosen in this embodiment comprises a first portion and a second portion, the lowest point of the first portion being at a lower level than the lowest point of the second portion. Of course, many other embodiments of recesses 10 may be chosen.

The shown embodiment of the neutral position means effects that fluctuation of the bearing 7 around the neutral position, in particular for a closing movement of the box doors 5 after an animal has passed through the entrance 4 in the feeding box, is rather abruptly counteracted. In the chosen embodiment of the curve path 8, the resistance against a movement of the box doors 5 in the direction towards the frame area 3 is greater than the resistance of the box doors 5 in the direction away from the frame area 3. This means that the bearing 7 quickly assumes the neutral position. Together with a quick locking of the box doors 5 by a locking means 11, it is prevented that another animal, in the chosen example a cow, is also able to enter the feeding box 1.

Locking takes place in that a control unit (not shown in the figures) controls an actuator 12 of the locking means 11 in such a way that the box doors 5 are blocked in the direction towards the frame area 3 and in the direction away from the frame area 3. A U-shaped section 13 with unequal sides is positioned, from a first position (FIG. 3a) in which the box doors are not blocked in any direction of rotation, over strips 14, 15 that are connected with the upper side of the box doors (FIG. 3b). In this second position of the locking means 11 the animal is now confined in the feeding box 1. The animal is not able to leave the feeding box, and another animal outside the feeding box has no access to the feeding box (FIG. 1, in which for the sake of clarity the animal is not depicted, and FIG. 3b). It is pointed out that, owing to the chosen constructive embodiment of the locking means 11, loads on the box doors 5 do not act on the actuator 18 of the locking means 11, but, much more favourably, on the frame 2 of the feeding box 1.

Figure 3C:
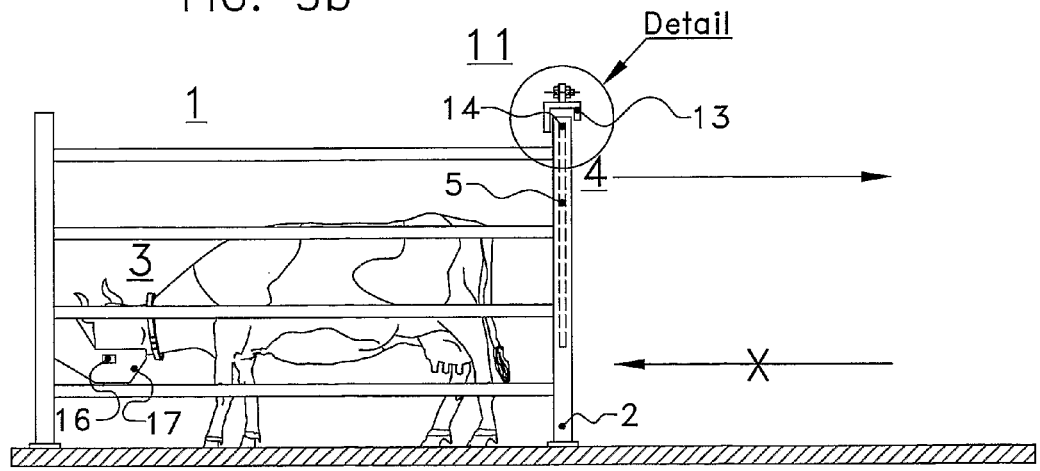

The animal in the feeding box 1 is identified by an identification means 16. Feed is now supplied to the animal in a feeding means 17 during an initially chosen eating period of time. Twenty minutes is a normal eating period of time for a cow. The supply of feed now takes place in dependence on the established identity of the animal and the historical, animal dependent data linked thereto. The feeding means 17 is only schematically shown in the figures. It is obvious that the feeding means per se may be a high-tech device including a feed trough. The supply of feed has to be understood in the broadest sense. Within the eating period of time the feed may be supplied, for example, in portions, periodically, continuously, at random chosen points of time. Besides supplying feed in an active manner, the term supply of feed used in this invention comprises supplying feed in a passive manner This means the supply of remaining feed. The proportion of concentrate/roughage can be attuned to the relevant animal. High-productive cows just receive concentrate. Low-productive cows, that do no longer need concentrate, receive a proportionally larger amount of roughage (by-products) to which some concentrate is added to make it tastier for the animal. This way of feeding can be considered as a cost-reducing way of feeding. In the case of continuous feeding, it is possible to alter the feed composition in order still to obtain a good "calorific" result per "long" chosen period of time, for example 48 hours. Consuming more implicates supplying more low-quality feed. In this case, the expected feed consumption of the animal, the consumption rate, the expected appetite, the period of time elapsed since the latest feeding, the ration type, the eating behaviour of the animal, etc. are further taken into account. The identified animal is now fed in a suitable manner, also in dependence on its identity. Remaining feed, left in the feeding means 17 after a previous supply of feed to another animal, is also taken into account. It is possible, for example, to use a threshold value for the weight of the remaining feed, additional feed being supplied in the situation in which the weight of the remaining feed is lower than the threshold value, and no further feed being supplied in the situation in which the weight of the remaining feed is greater than the threshold value. It is essential that feed is supplied to the animal at all times and that the animal is not contractually disturbed in a physical way by other animals during eating. A programmed eating period of time or an eating period of time directly inputted into the control unit begins immediately after confining the animal in the feeding box. During the initially chosen eating period of time, an animal in the feeding box has no possibility of leaving the feeding box. After the initially chosen eating period of time has elapsed, the animal in the feeding box is given the possibility of leaving the feeding box during a chosen first waiting time span and access to the feeding box remains impeded for an animal outside the feeding box. For this purpose, the locking means 11 is moved from the second position into a third position (FIG. 3*b*→FIG. 3*c*). The U-section 13 with the unequal sides, the longest side being located at the side of the frame area and the shortest side being located at the side of the entrance of the feeding box, is now positioned in such a way that pivoting of the box doors 5 towards the frame area 3 is blocked. The strips 14, 15 at the upper side of the box doors 5 are blocked upon pivoting by the long side of the U-section 13. The strips 14, 15, and consequently the box doors 5, are not blocked in the direction away from the frame area 3. If, after this initially chosen eating period of time has elapsed, the animal does not leave the feeding box 1 within a first waiting time span chosen contiguously to said period of time, the supply of feed to the animal in the feeding box in a chosen eating period of time is repeated. The length of the now again chosen eating period of time is now again adjustable. The supply of feed now means that, if an amount of feed larger than a threshold value is still present in the feeding means, no additional feed is supplied, and, if an amount of feed smaller than a threshold value is present in the feeding means, feed is supplied again. This feeding strategy can now simply be repeated: if, after the chosen eating periods(s) of time following the initially chosen eating period of time has/have elapsed (thus, also after the chosen first waiting time span), the animal does not leave the feeding box within the waiting time span(s) chosen contiguously to said following chosen eating period (s) of time, the step of supplying feed can be repeated in said following chosen eating period(s) of time. For the initially chosen eating period of time, the chosen eating period of time, the following chosen eating period(s) of time, the chosen first waiting time span, the chosen waiting time span(s), a value is adjustable at any moment.

The feed consumption of the animal can be observed within the chosen eating period of time following after the initial eating period of time has elapsed and, when a chosen second waiting time span in which no feed consumption takes place is exceeded or when the feed consumption rate is below a chosen feed consumption rate threshold value, an animal outside the feeding box can be given access to the feeding box. It is also possible to decide to give the animal in the feeding box the possibility of leaving the feeding box after the initially chosen eating period of time has elapsed, and to give an animal outside the feeding box access to the feeding box. If now the animal does not leave the feeding box within a chosen third waiting time span, closing the feeding box takes place again in such a way that access to the feeding box for an animal outside the feeding box is impeded. Now feed is again supplied to the animal in the feeding box in a chosen eating period of time. Also now it applies that the aforementioned feeding strategy can be repeated: if, after the chosen third waiting time span following the initially chosen eating period of time has elapsed (thus also after the chosen first waiting time span), the animal does not leave the feeding box in the following chosen eating period(s) of time with chosen waiting time span(s), the aforementioned steps take place again.

It is possible to make the choice of closing the feeding box only in case of an animal that is eligible to eat. For this purpose, the established identity of an animal is used. Feed is supplied to the animal in the feeding box in a chosen initial eating period of time. Only after an initially chosen eating period of time has elapsed, the animal that is eligible to eat in the feeding box is given the possibility of leaving the feeding box, access to the feeding box remaining impeded for an animal outside the feeding box. As soon as the animal leaves the feeding box, the animal is reported off in a control unit and remaining feed is recorded at the same time.

Finally it is pointed out that the described installation also comprises concepts in which the inventive idea is carried out in separate components. In this case, an arrangement is conceivable in which the feeding box consists of an at any rate at least partially enclosed frame area comprising a frame with an entrance via at least one passage means, the feeding means constituting part of a separate feeding installation, for example a feeding installation in which the feeding means are positioned around a central axis and the feeding box is not directly connected with the separate feeding installation. The feeding box according to the invention may also constitute part of an installation for milking an animal or vice versa. The feeding box may comprise several entrances and exits to which the invention can be applied.

The invention claimed is:

1. A method of feeding an animal in a feeding box, the method comprising, in no particular order, at least actions of
   a) registering presence of the animal in the feeding box;
   b) closing the feeding box and locking the feeding box in such a way that access to the feeding box is impeded for an animal outside the feeding box;
   c) supplying feed to the animal in the feeding box in a chosen eating period of time, wherein the method further comprises:
   allowing an initially chosen eating period of time to elapse, the initially chosen eating period of time beginning immediately after closing the feeding box,
      providing a first waiting time span chosen contiguously to said eating period of time, selectively unlocking the feeding box such that the animal is given the possibility of leaving the feeding box while access to the feeding box remains impeded for an animal outside the feeding box, and
   in the case that the animal does not leave the feeding box within the waiting time span, repeating at least the action of c) of supplying feed.

2. The method of feeding an animal in a feeding box as claimed in claim 1, wherein, for the animal that does not leave the feeding box after the chosen eating period(s) of time following the initially chosen eating period of time has elapsed, within the chosen waiting time span(s) chosen contiguously to said following chosen eating period(s) of time, in which the animal is given the possibility of leaving the feeding box, step c) is repeated in the chosen waiting time span.

3. The method of feeding an animal in a feeding box as claimed in claim 1 wherein, during the initially chosen eating period of time, the animal in the feeding box has no possibility of leaving the feeding box.

4. The method of feeding an animal in a feeding box as claimed in claim 1, wherein, after the initially chosen eating period of time has elapsed, the animal in the feeding box is given the possibility of leaving the feeding box and access to the feeding box remains impeded for an animal outside the feeding box.

5. The method of feeding an animal in a feeding box as claimed in claim 4, wherein the feed consumption of the animal is observed and, when a chosen second waiting time span in which no feed consumption takes place is exceeded, access to the feeding box becomes possible.

6. The method of feeding an animal in a feeding box as claimed in claim 4 wherein the feed consumption rate of the animal is observed and, when the feed consumption rate is below a chosen feed consumption rate threshold value, access to the feeding box becomes possible.

7. The method of feeding an animal in a feeding box as claimed in claim 4, wherein, if the animal does not leave the feeding box within a chosen third waiting time span, actions b) and c) take place.

8. The method of feeding an animal in a feeding box as claimed in claim 7, wherein, if, after the chosen eating period of time following the initially chosen eating period of time has elapsed, the animal does not leave the feeding box within the waiting time span, chosen contiguously to said following chosen eating period of time, in which the animal is given the possibility of leaving the feeding box, actions b) and c) take place.

9. The method of feeding an animal in a feeding box as claimed in claim 1, wherein, after the initially chosen eating period of time has elapsed, the animal in the feeding box is given the possibility of leaving the feeding box and an animal outside the feeding box is given access to the feeding box.

10. The method as claimed in claim 1, comprising the additional step of:
identifying the animal in the feeding box.

11. An installation for feeding an animal, which installation is provided with a frame that encloses at any rate at least partially a frame area, the frame area being suitable for receiving an animal, and with an entrance to the frame area which comprises at least one passage device that is movably connected with the frame for closing or releasing the frame area, a locking device for locking the passage device, an identification device for identifying an animal, a feeding device for supplying feed to an animal in the installation, and a control unit for controlling the locking device and the feeding device, wherein the control unit is programmed for performing a method as claimed in claim 1.

12. The installation as claimed in claim 11, wherein the locking device is controllable by the control unit for blocking the direction of movement of the at least one passage device in a direction towards the frame area and for releasing simultaneously a direction of movement of the passage device in a direction away from the frame area.

13. An installation as claimed in claim 12, wherein, between the at least one passage device and the frame, a neutral position which neutral position device is arranged for positioning the passage device into one particular neutral position.

14. The installation as claimed in claim 13, wherein the neutral position device comprises a moving element and a guiding element that is provided with a curve path, the curve path of the guiding element extending from the neutral position in a rising manner on both sides of the neutral position, which moving element and curve path of the guiding element are in contact with each other, in such a way that the moving element is movable over the curve path, in such a way that the moving element is capable of assuming the neutral position under the influence of gravitational force.

15. The installation as claimed in claim 14, wherein the curve path of the guiding element has a recess at the place of the neutral position.

16. The installation as claimed in claim 15, wherein the curve path comprises a first portion and a second portion, the lowest point of the first portion being at a lower level than the lowest point of the second portion.

* * * * *